(12) United States Patent
Volkmann et al.

(10) Patent No.: US 6,464,281 B2
(45) Date of Patent: Oct. 15, 2002

(54) MOTOR-VEHICLE MODULAR DASHBOARD

(75) Inventors: Tilo Volkmann, Sindelfingen (DE); Ralf Zipperle, Althengstett (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/810,344

(22) Filed: Mar. 19, 2001

(65) Prior Publication Data

US 2001/0033087 A1 Oct. 25, 2001

(30) Foreign Application Priority Data

Mar. 17, 2000 (DE) .......................... 100 13 434

(51) Int. Cl.⁷ .................... B62D 25/14; B60R 7/06; B60N 3/00
(52) U.S. Cl. ................... 296/70; 224/926; D12/419
(58) Field of Search .............. 296/24.1, 37.14, 296/37.8, 70; 224/539, 926; D12/415, 419

(56) References Cited

U.S. PATENT DOCUMENTS

| | | | | |
|---|---|---|---|---|
| 5,048,083 A | * | 9/1991 | Dunchock | 296/37.8 |
| 5,131,036 A | * | 7/1992 | Dunchock | 224/42.42 |
| 5,150,406 A | * | 9/1992 | Dunchock | 224/42.42 |
| 5,692,718 A | * | 12/1997 | Bieck | 224/926 |
| 5,765,736 A | * | 6/1998 | Fischer et al. | 224/926 |
| 5,803,421 A | | 9/1998 | Kerner et al. | |
| 5,823,599 A | | 10/1998 | Gray | |
| 5,860,630 A | | 1/1999 | Wildey et al. | |
| 6,010,047 A | * | 1/2000 | Osborn | 224/926 |
| 6,036,152 A | * | 3/2000 | Hiscox et al. | 224/926 |

FOREIGN PATENT DOCUMENTS

| | | | | |
|---|---|---|---|---|
| DE | 4013209 | * | 10/1991 | 224/540 |
| DE | 9202265 | | 9/1992 | |
| DE | 4307224 | | 2/1994 | |
| DE | 4231219 | | 3/1994 | |
| DE | 94 18 788 | | 6/1995 | |
| DE | 19534435 | | 9/1995 | |
| DE | 19539066 | | 11/1996 | |
| DE | 19737739 | | 3/1999 | |
| DE | 19820581 | | 6/1999 | |
| EP | 0083701 | | 7/1983 | |
| EP | 0830967 | | 9/1997 | |
| EP | 0950572 | | 10/1999 | |
| EP | 0955189 | | 9/2000 | |
| FR | 2765175 | | 12/1998 | |
| GB | 2339734 | | 2/2000 | |
| JP | 5-213115 | * | 8/1993 | 296/37.17 |
| JP | 11005459 | | 1/1999 | |

OTHER PUBLICATIONS

Copy of Serch Report.

* cited by examiner

*Primary Examiner*—D. Glenn Dayoan
*Assistant Examiner*—H. Gutman
(74) *Attorney, Agent, or Firm*—Crowell & Moring LLP

(57) ABSTRACT

A motor-vehicle dashboard of modular construction has an upper part module which extends below a windscreen essentially over the entire width of the vehicle interior, a driver's side module which is arranged below the upper part module on the driver's side, a front-passenger's side module which is arranged below the upper part module on the front-passenger's side, and a central console module which is arranged below the upper part module between the driver's side module and front-passenger's side module. In order to improve the capability of this dashboard to be customized, it is proposed to arrange a variable module below the upper part module between the central console module and front-passenger's side module. The variable module is designed, in a standard equipment variant, as a paneling element whose outside is shaped in order to form a smooth transition between the outsides of the central console module and the front-passenger's side module, and which is designed, in a special equipment variant, as a functional element associated with an additional function for the dashboard.

10 Claims, 3 Drawing Sheets

MOTOR-VEHICLE MODULAR DASHBOARD

BACKGROUND AND SUMMARY OF THE INVENTION

The invention relates to a motor-vehicle dashboard of modular construction having an upper part module which extends below a windscreen substantially over an entire width of a vehicle interior, a driver's side module which is arranged below the upper part module on the driver's side, a front-passenger's side module which is arranged below the upper part module on the front-passenger's side, and a central console module which is arranged below the upper part module between the driver's side module and front-passenger's side module.

A dashboard of this type is disclosed, for example, in European Patent Document EP 0 083 701 A2, and has an upper part module which extends essentially over the entire width of the vehicle interior below a windscreen of the vehicle. Arranged on the driver's side below this upper part module is a driver's side module which has, for example, important instruments for the operation of the vehicle, e.g. speedometer, tachometer and oil temperature display. In addition, the driver's side module is prepared or pre-shaped in order to accommodate the steering column. Arranged on the front-passenger's side below the upper part module is a front-passenger's side module which, for example, has a glove compartment. Arranged below the upper part module between the driver's side module and the front-passenger's side module is a central console module which, for example, contains control elements for a vehicle air-conditioning device and central nozzles thereof. The modular character of a dashboard of this type arises by virtue of the fact that individual modules of different design can be combined with one another. For example, a plurality of different embodiments are provided for the central console module and then are installed into the dashboard according to choice depending on the desired equipment variant. The great advantage of a modular system is seen in the fact that, in order to form different variants, new embodiments only have to be provided or produced for the different individual modules.

In European Patent Document EP 0 830 967 A1, a dashboard is disclosed which is composed of at least four individual parts. A lower part is fastened to a vehicle part and has an upwardly open, basin-shaped contour. An instrument block is arranged at the top and in the center of the lower part. Basin-shaped covers are arranged on both sides of the instrument block and are fastened to the lower part and to one another in a releasable manner by way of rapid fastening means. These covers may have various embodiments enabling individually designed dashboards to be constructed depending on the customer's requirements.

In German Patent Document DE 43 07 224 A1, a telephone console is depicted which is attached to the central console of the dashboard in the front-passenger's legroom and contains a telephone installation. The telephone installation depicted here is therefore formed by an additional component which can additionally be attached to a conventional dashboard, this taking place at the expense of the front-passenger's legroom.

In German Patent Document DE 92 02 265 U1, likewise a telephone console is depicted which can optionally be fitted in the front-passenger's legroom at the side of the central console of the dashboard as an additional component.

In German Patent Document DE 40 13 209 A1, a storage console for a handset of a car telephone is depicted, the console being attached onto a side cheek of a central console of the dashboard. This attachable storage console therefore also forms a component which can be additionally attached to a conventional dashboard.

An object of the present invention is to improve the capability of a dashboard of the type mentioned at the beginning to be customized.

According to the invention, this object is achieved by a dashboard having an upper part module which extends below a windscreen substantially over an entire width of a vehicle interior, a driver's side module which is arranged below the upper part module on the driver's side, a front-passenger's side module which is arranged below the upper part module on the front-passenger's side, and a central console module which is arranged below the upper part module between the driver's side module and front-passenger's side module.

The object is based on the general concept of additionally integrating a variable module into the dashboard, at least two different variants being provided for this variable module, namely at least one standard equipment variant and at least one special equipment variant. In its simplest embodiment, the standard equipment variant of the variable module serves as a paneling element which is integrated into the outer contour of the dashboard. In the special equipment variant of the variable module, the latter is designed as a functional element associated with an additional function for the dashboard or for the vehicle comfort. In this case, the additional function of the functional element depends on the respective driver's requirements or on the choice of special equipment variants provided by the vehicle manufacturer.

The additional variable module increases the variability of the dashboard, with the result that the dashboard can be better customized. This is because the variable module enables optional special requirements to be taken into consideration by way of the special equipment variant of the variable module. If the customer does not require special equipment of this type, then a standard equipment variant of the variable module can be used for the assembly of the dashboard.

The integration of the variable module into the dashboard does not have any adverse consequence here on the legroom region of the front passenger. Loss of comfort, risks of injury for the front passenger and risks of damage to components of the dashboard are reduced as a result.

According to a preferred embodiment, in its special equipment variant, the variable module can be designed to hold a telephone or a telephone installation or a radiotelephone. This enables relatively expensive special equipment to be optionally integrated into the dashboard.

According to a particularly advantageous embodiment, the variable module can be fastened to the front-passenger's side module and/or to the central console module and/or to the upper part module by rapid fasteners, as a result of which the integration of the variable module into the dashboard during assembly thereof is simplified.

In a particularly advantageous embodiment, the rapid fasteners of the variable module are designed such that they can be released in such a manner that standard equipment variants and special equipment variants of the variable module can be interchanged non-destructively. These measures make it possible also to integrate a special equipment variant subsequently into the dashboard, this being done by interchanging it with the respective standard equipment variant. In the dashboard according to the invention, the subsequent installation of the special equipment variant then has the same advantages as an original installation of the special equipment variant. In particular, it cannot be detected whether the particular special equipment has been installed subsequently or is part of the original equipment. In this respect, the result is a particular visual and aesthetic advantage of the dashboard according to the invention compared to solutions from the prior art which use elements which are fitted on in addition.

Further important features and advantages of the device according to the invention are contained in the subclaims, in the drawings and in the associated description of the figures which refers to the drawings.

It is understood that the features mentioned above and those which are still to be explained below can be used not only in the combination specified in each case, but can also be used in other combinations, or on their own, without departing from the scope of the present invention.

Other objects, advantages and novel features of the present invention will become apparent from the following detailed description of the invention when considered in conjunction with the accompanying drawings.

DETAILED DESCRIPTION OF THE DRAWINGS

Figure 1:
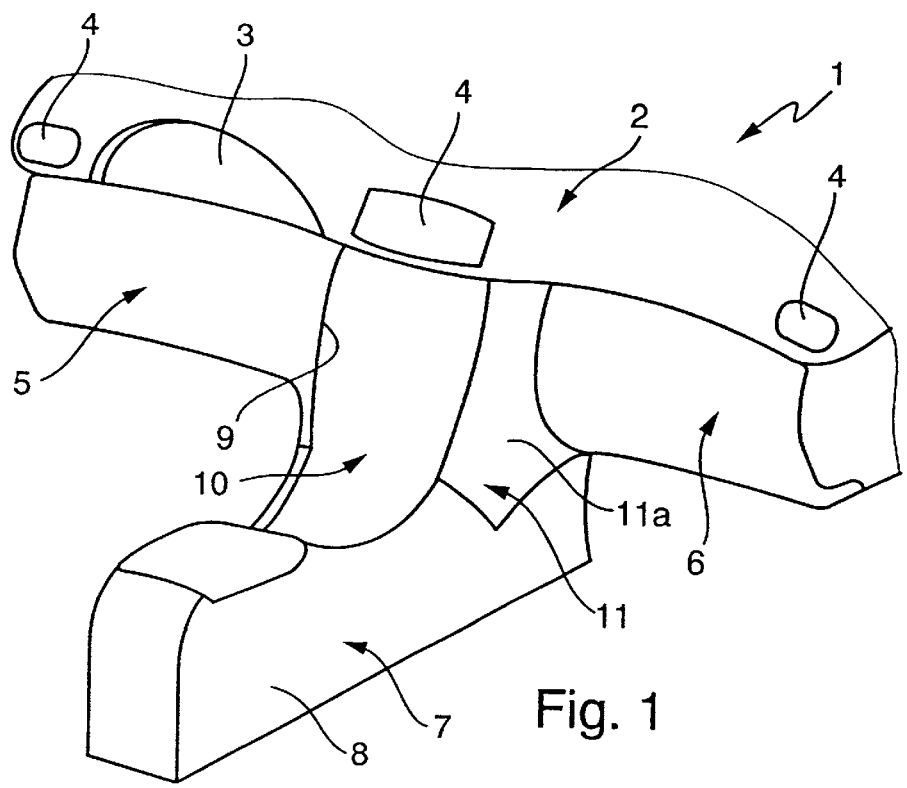
FIG. 1 shows a perspective view of a dashboard according to the invention in a first embodiment.

According to FIGS. 1 to 4, a dashboard 1 which is of modular construction according to the invention has an upper part module 2 which extends essentially over the entire width of a vehicle interior below a windscreen (not illustrated). Air outlet nozzles 4, for example, are formed here in this upper part module. In addition, the upper part module 2 can be provided with a recess 3 in which a group of instruments having important instruments for operating the vehicle can be accommodated. Accordingly, the dashboard 1 which is illustrated here is designed for a left-hand-drive vehicle. The dashboard 1 can also be designed in a corresponding manner for a right-hand-drive vehicle.

On the driver's side, the dashboard 1 has a driver's side module 5 which is arranged below the upper part module 2. The driver's side module 5 can contain typical control elements for the vehicle driver. In addition, the driver's side module 5 is prepared for accommodating a steering column. The driver's side module 5 is expediently connected to the upper part module 2 via rapid fasteners, e.g., clip connections. The driver's side module 5 can also be screwed to the upper part module 2.

On the front-passenger's side, a front-passenger's side module 6 is arranged below the upper part module 2 in a corresponding manner. This front-passenger's side module 6 may, for example, have a glove compartment and/or be provided with a front-passenger's airbag. Rapid fasteners can also be provided here in order to connect the front-passenger's side module 6 to the upper part module 2.

Arranged below the upper part module 2 between the driver's side module 5 and the front-passenger's side module 6 is a central console module 7 whose lower section can be designed as a tunnel covering 8 and which contains, on an upper side, a receiving opening 9 into which here a functional module 10 is inserted. This functional module 10 may, for example, contain an audio system and/or an air-conditioning device. In addition, the functional module 10 may have further storage compartments. In a vehicle designed as a taxi, the functional module 10 expediently contains a taximeter.

In order to fasten the modules to one another, rapid fasteners are preferred so as to simplify the assembly of the dashboard 1.

A variable module 11 is arranged below the upper part module 2 between the central console module 7 and the front-passenger's side module 6. This variable module 11 is also preferably fastened to the central console module 7 and/or to the front-passenger's side module 6 and/or to the upper part module 2 by rapid fasteners.

According to FIG. 1, the variable module 11 has a simple standard equipment variant 11a in which the variable module 11 merely serves as a paneling element, the outside of the variable module 11, which is exposed to the vehicle interior, then being shaped in such a manner that a smooth transition arises between the outsides of the central console module 7 and the front-passenger's side module 6 which are exposed to the vehicle interior. In this manner, the variable module 11 is an integral component of the dashboard 1, the component being matched visually to the contour of the dashboard 1.

Figure 2:
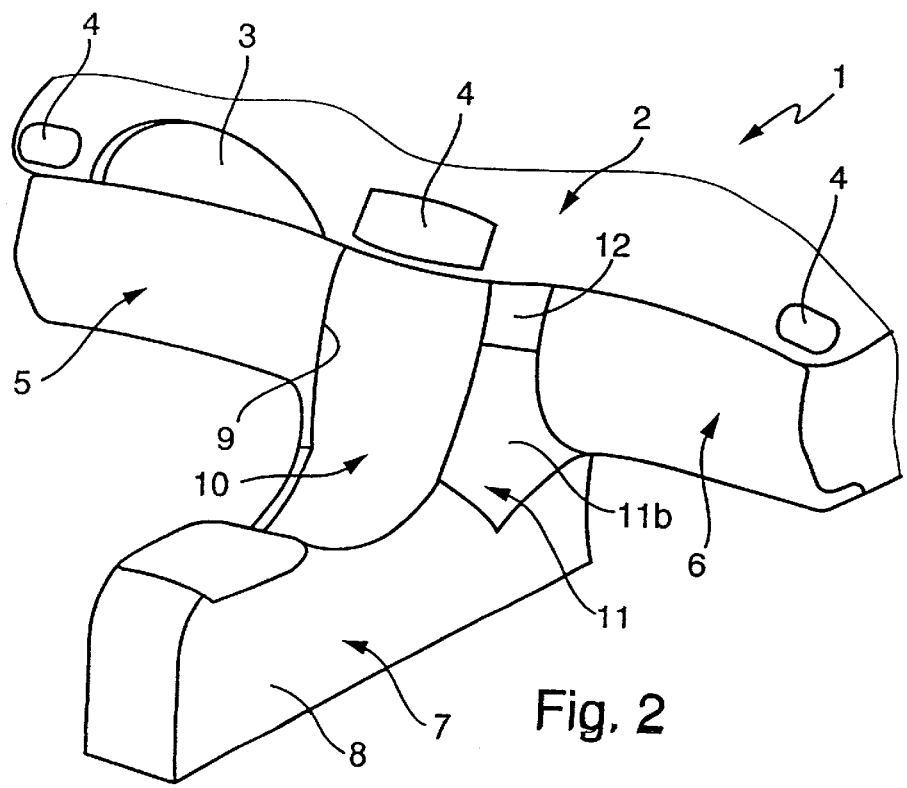
FIG. 2 shows a view, as in FIG. 1, of a second embodiment.

According to FIG. 2, in a more convenient embodiment 11b of its standard equipment variant, the variable module 11 can have an additional storage compartment and/or a cup holder 12. It is obvious that basically any embodiments of a storage compartment 12 of this type or of a cup holder 12 of this type are possible. In particular, the storage compartment 12 can be open or can be closed by a cover.

Figure 3:
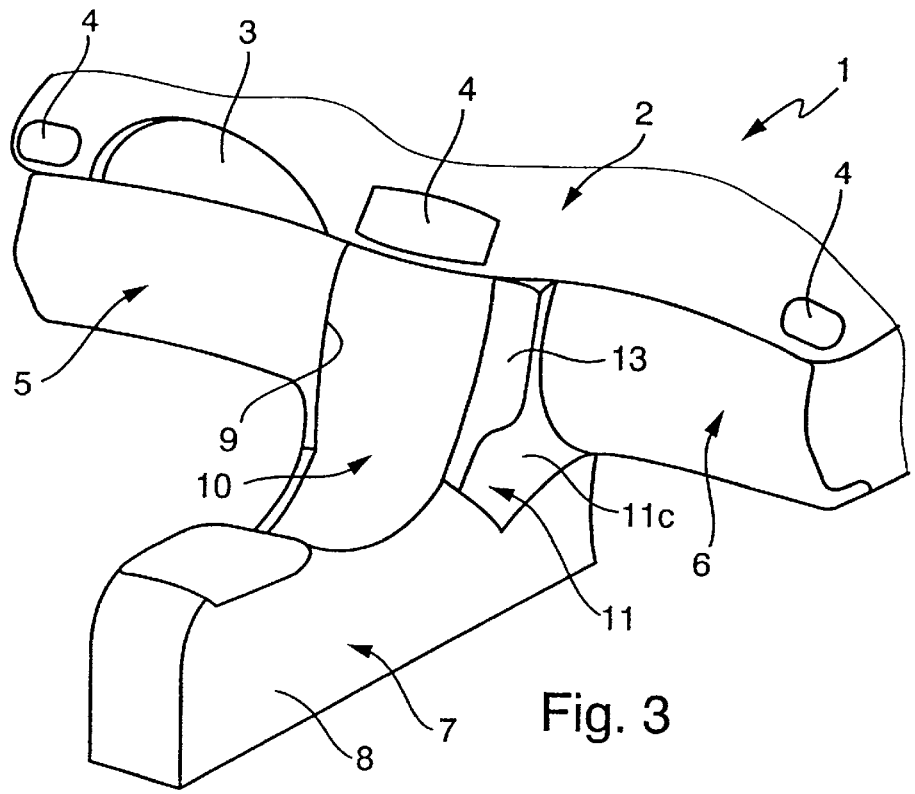
FIG. 3 shows a view, as in FIG. 1, of a third embodiment.

According to FIG. 3, the variable module 11 can have a special equipment variant 11c which can be provided with a receiver 13. This receiver 13 is used, for example, for the setting down of a telephone receiver of a telephone installation fixedly installed in the vehicle. The receiver 13 can also be used for accommodating a mobile telephone, the receiver 13 expediently containing appropriate connections for a hands-free installation. The variable module 11 preferably contains the essential components of the telephone installation, with the result that, in order to assemble a dashboard 1 which is provided with a telephone installation, instead of a standard equipment variant 11a or 11b of the variable module 11 merely the special equipment variant 11c needs to be fitted, It is clear that, instead of a telephone installation, a radio installation, e.g. a radiotelephone, can also be integrated into the variable module 11.

Figure 4:
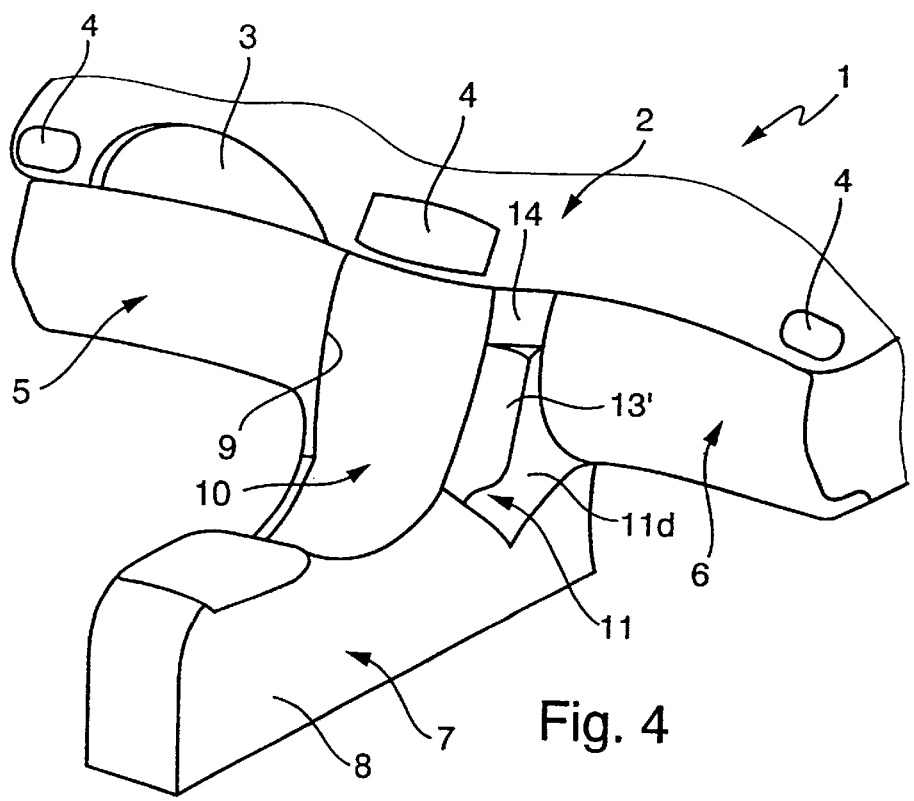
FIG. 4 shows a view, as in FIG. 1, of a fourth embodiment.

According to FIG. 4, in a particularly convenient embodiment of its special equipment variant 11d, the variable module 11 can, in addition to the modified receivers 13', also be provided with a storage compartment and/or with a cup holder 14. Here too, basically any desired embodiments of the storage compartment 14 and of the cup holder 14 are possible.

As shown from FIGS. 1 to 4, in all its embodiments the variable module 11 is integrated visually into the outer contour or into the aspect of the dashboard 1, as a result of which a pleasing aesthetic appearance can be obtained. In addition, the legroom of the front passenger is not adversely affected by the integration of functional units into the variable module 11. In particular, this does not produce any risk of injury for the front passenger. Special equipment components which are relatively expensive to acquire are especially and expediently suitable for integrating into the variable module 11. For example, a variable module 11 of this type can be provided with a hands-free installation for a mobile telephone, with a fixedly installed telephone installation, with a radiotelephone, with a taximeter or with a navigation device. In addition, additional storage compartments can be provided. Furthermore, a cover or a flap can be provided in order to conceal the particular functional unit, for example telephone.

Figure 5:
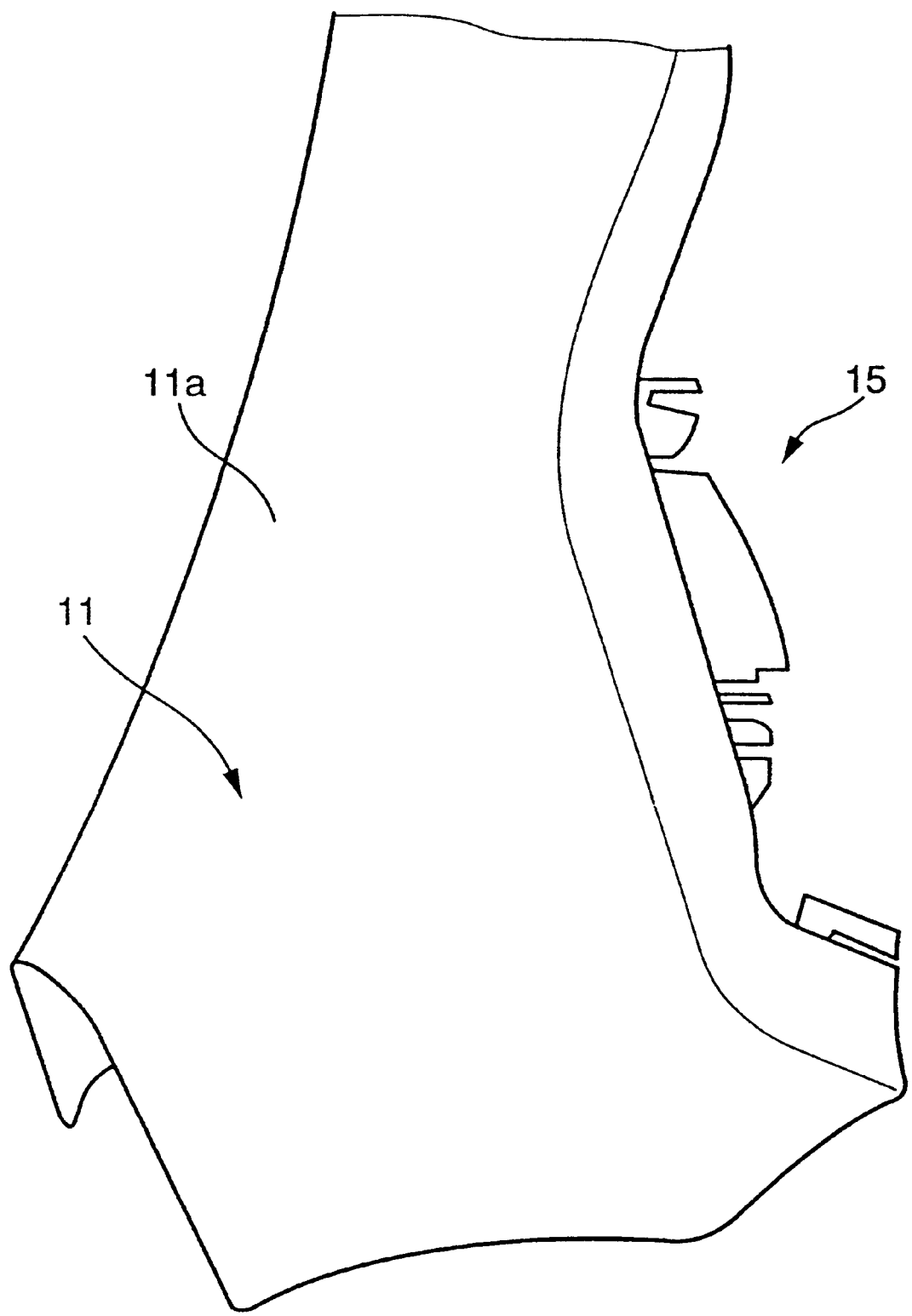
FIG. 5 shows a perspective view of a variable module in its standard equipment variant according to FIG. 1, as an enlarged illustration.

According to FIG. 5, the variable module 11, here in a simple embodiment 11a of its standard equipment variant, is shaped in such a manner that the variable module 11 can be fitted on the dashboard 1 even if all of the other modules have already been fitted. For this purpose, a variable module 11 has rapid fasteners 15 which are designed as plug-in connecting elements. It is particularly advantageous if these fastening elements are designed in such a manner that they enable the variable module 11 to be removed without destruction of the fastening elements and without destruction of the variable module 11. This makes it possible to subsequently interchange a standard equipment variant 11a or 11b of the variable module 11 for a special equipment variant 11c or 11d of the variable module 11. The dashboard 1 can therefore be subsequently fitted with superior special equipment elements.

The configuration of the variable module 11 and the configuration of its rapid fasteners 15 are expediently selected in such a manner that the different design variants of the variable module 11 can be interchanged for one another, even when the dashboard 1 is fixedly installed in the vehicle, without complex and costly installation work being required for this purpose.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motor-vehicle dashboard of modular construction having an upper part module which extends below a windscreen substantially over an entire width of a vehicle interior,
    having a driver's side module which is arranged below the upper part module on the driver's side,
    having a front-passenger's side module which is arranged below the upper part module on the front-passenger's side, and
    having a central console module which is arranged below the upper part module between the driver's side module and front-passenger's side module,
    wherein an interchangeable variable module is arranged below the upper part module between the central console module and the front-passenger's side module, the variable module being designed, in a standard equipment variant, as a paneling element with an outside shaped in order to form a substantially flush smooth transition between outsides of the central console module and the front-passenger's side module, and which is designed, in a special equipment variant, as a functional element associated with an additional function for the dashboard.

2. Dashboard according to claim 1, wherein in the special equipment variant, the variable module is designed to hold one of a telephone, a telephone installation and a radiotelephone.

3. Dashboard according to claim 1, wherein in the standard equipment variant and in the special equipment variant, the variable module has a cup holder or a storage compartment.

4. Dashboard according to claim 1, wherein the variable module is fastened to one of the front-passenger's side module, the central console module and the upper part module by rapid fasteners.

5. Dashboard according to claim 4, wherein said rapid fasteners are designed to be released in such a manner that the standard equipment variant of the variable module and the special equipment variant of the variable module can be interchanged non-destructively.

6. Dashboard according to claim 1, wherein said modules adjacent one another are fastened to one another by rapid fasteners.

7. Dashboard according to claim 1, wherein a functional module is inserted into the central console module.

8. Dashboard according to claim 7, wherein the functional module has one of an air-conditioning device, an audio system, a taximeter and a radiotelephone.

9. Motor-vehicle dashboard of modular construction, having an upper part module which extends below a windscreen substantially over an entire width of a vehicle interior,
    having a driver's side module which is fastened below the upper part module on the diver's side,
    having a front-passenger's side module which is fastened below the upper part module on the front-passenger's side, and having a central console module which is fastened below the upper part module between the driver's side module and the front-passenger's side module,
    wherein an interchangeable variable module is arranged below the upper part module between the central console module and the front-passenger's side module, the variable module being fastened to one of the central console module, the front-passenger's side module and the upper part module, said variable module being designed, in a special equipment variant, as a functional element associated with an additional function for the dashboard, and being designed, in a standard equipment variant, as a paneling element without an additional function where an outside is shaped in order to form a substantially flush smooth transition between outsides of the central console module and the front-passenger's side module.

10. A method of making a vehicle dashboard of modular construction, comprising:
    providing an upper part module extending below a windscreen substantially over a width of a vehicle interior,
    fastening a driver's side module below the upper part module on the driver's side,
    fastening a front-passenger's side module below the upper part module on the front-passenger's side,
    fastening a central console module below the upper part module between the driver's side module and the front-passenger's side module, and
    arranging a variable module below the upper part module between the central console module and the front-passenger's side module,
    wherein the variable module is fastened to at least one of the central console module, the front-passenger's side module and the upper part module, the variable module is designed, in a special equipment variant as a functional element associated with an additional function for the dashboard, and is designed, in a standard equipment variant, as a paneling element without an additional function with an outside shaped to form a smooth transition between outsides of the central console module and the front-passenger's side module.

* * * * *